US009426649B2

(12) United States Patent
Sirotkin et al.

(10) Patent No.: US 9,426,649 B2
(45) Date of Patent: Aug. 23, 2016

(54) APPARATUS, SYSTEM AND METHOD OF SECURING COMMUNICATIONS OF A USER EQUIPMENT (UE) IN A WIRELESS LOCAL AREA NETWORK

(71) Applicant: INTEL IP CORPORATION, Santa Clara, CA (US)

(72) Inventors: Alexander Sirotkin, Giv'on Hachadasha (IL); Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/492,356

(22) Filed: Sep. 22, 2014

(65) Prior Publication Data

US 2015/0215777 A1   Jul. 30, 2015

Related U.S. Application Data

(60) Provisional application No. 61/933,854, filed on Jan. 30, 2014.

(51) Int. Cl.
*H04M 1/68* (2006.01)
*H04W 12/04* (2009.01)
*H04W 12/06* (2009.01)
*H04L 29/06* (2006.01)
*H04W 48/12* (2009.01)

(52) U.S. Cl.
CPC .............. *H04W 12/04* (2013.01); *H04L 63/062* (2013.01); *H04L 63/0892* (2013.01); *H04W 12/06* (2013.01); *H04W 48/12* (2013.01); *H04L 63/18* (2013.01)

(58) Field of Classification Search
CPC ....................................................... H04W 12/06
USPC ........................................................... 455/411
See application file for complete search history.

(56) References Cited

U.S. PATENT DOCUMENTS

| 8,190,191 B2* | 5/2012 | Livet et al. .................. 455/550.1 |
| 2005/0197098 A1* | 9/2005 | Trossen ......................... 455/406 |
| 2007/0171910 A1* | 7/2007 | Kumar ........................... 370/392 |
| 2007/0173283 A1* | 7/2007 | Livet et al. .................. 455/552.1 |
| 2008/0101400 A1* | 5/2008 | Auterinen ..................... 370/463 |

(Continued)

FOREIGN PATENT DOCUMENTS

WO   2013055106   4/2013

OTHER PUBLICATIONS

International Search Report and Written Opinion for International Patent Application No. PCT/US2015/011891, mailed on Apr. 29, 2015, 12 pages.

(Continued)

*Primary Examiner* — Santiago Garcia
(74) *Attorney, Agent, or Firm* — Shichrur & Co.

(57) ABSTRACT

Some demonstrative embodiments include devices, systems of securing communications of a User Equipment (UE) in a Wireless Local Area Network (WLAN). For example, a cellular node may transmit to a UE a cellular message including a UE security key, and a WLAN access device may communicate with the cellular node security information including the UE security key. The WLAN access device may communicate with the UE based on the UE security key, e.g., to authenticate the UE and/or encrypt communications with the UE.

20 Claims, 4 Drawing Sheets

(56) References Cited

U.S. PATENT DOCUMENTS

| | | | |
|---|---|---|---|
| 2008/0267407 A1* | 10/2008 | Vanderveen | 380/277 |
| 2010/0229229 A1* | 9/2010 | Kumar et al. | 726/7 |
| 2010/0275249 A1* | 10/2010 | McCann et al. | 726/5 |
| 2011/0167478 A1* | 7/2011 | Krishnaswamy et al. | 726/4 |
| 2011/0243256 A1* | 10/2011 | Matsuoka | 375/259 |
| 2012/0115441 A1* | 5/2012 | Schell | 455/411 |
| 2014/0072119 A1* | 3/2014 | Hranilovic et al. | 380/270 |
| 2014/0113590 A1* | 4/2014 | Meylan et al. | 455/411 |
| 2014/0204927 A1* | 7/2014 | Horn et al. | 370/338 |
| 2014/0355562 A1* | 12/2014 | Gao et al. | 370/331 |
| 2015/0049684 A1* | 2/2015 | Kim et al. | 370/329 |
| 2015/0092701 A1* | 4/2015 | Horn et al. | 370/329 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

3GPP TS 23.402 V12.1.0 (Jun. 2013); 3rd Generation Partnership Project; Technical Specification Group Services and System Aspects; Architecture enhancements for non-3GPP accesses (Release 12); Jun. 2013; 254 pages.

3GPP TS 36.413 V12.0.0 (Dec. 2013); 3rd Generation Partnership Project; Technical Specification Group Radio Access Network; Evolved Universal Terrestrial Radio Access Network (E-UTRAN); S1 Application Protocol (S1AP) (Release 12); Dec. 2013; 151 pages.

3GPP TS 36.323 V11.2.0 (Mar. 2013); 3rd Generation Partnership Project; Technical Specification Group Radio Access Network; Evolved Universal Terrestrial Radio Access (E-UTRA); Packet Data Convergence Protocol (PDCP) specification (Release 11); Mar. 2013; 27 pages.

3GPP TS 36.322 V11.0.0 (Sep. 2012); 3rd Generation Partnership Project; Technical Specification Group Radio Access Network; Evolved Universal Terrestrial Radio Access (E-UTRA); Radio Link Control (RLC) protocol specification (Release 11); Sep. 2012; 39 pages.

3GPP TS 36.321 V11.4.0 (Dec. 2013); 3rd Generation Partnership Project; Technical Specification Group Radio Access Network; Evolved Universal Terrestrial Radio Access (E-UTRA); Medium Access Control (MAC) protocol specification (Release 11); Dec. 2013; 57 pages.

3GPP TS 36.331 V11.5.0 (Sep. 2013); 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.

3GPP TS 36.300 V11.6.0 (Jun. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Jun. 2013; 209 pages.

* cited by examiner

APPARATUS, SYSTEM AND METHOD OF SECURING COMMUNICATIONS OF A USER EQUIPMENT (UE) IN A WIRELESS LOCAL AREA NETWORK

CROSS REFERENCE

This application claims the benefit of and priority from U.S. Provisional Patent Application No. 61/933,854 entitled "WLAN Security for Integrated eNB/AP", filed Jan. 30, 2014, the entire disclosure of which is incorporated herein by reference.

TECHNICAL FIELD

Some embodiments described herein generally relate to securing communications of a User Equipment (UE) in a wireless local area network (WLAN).

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks. For example, 3rd Generation Partnership Project (3GPP) TR 37.834 ("Technical Specification Group Radio Access Network; WLAN/3GPP Radio Interworking (Release 12)"), relates to potential Radio Access Network (RAN) level enhancements for WLAN/3GPP Interworking. The 3GPP specifies several features for 3GPP-WLAN interworking.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
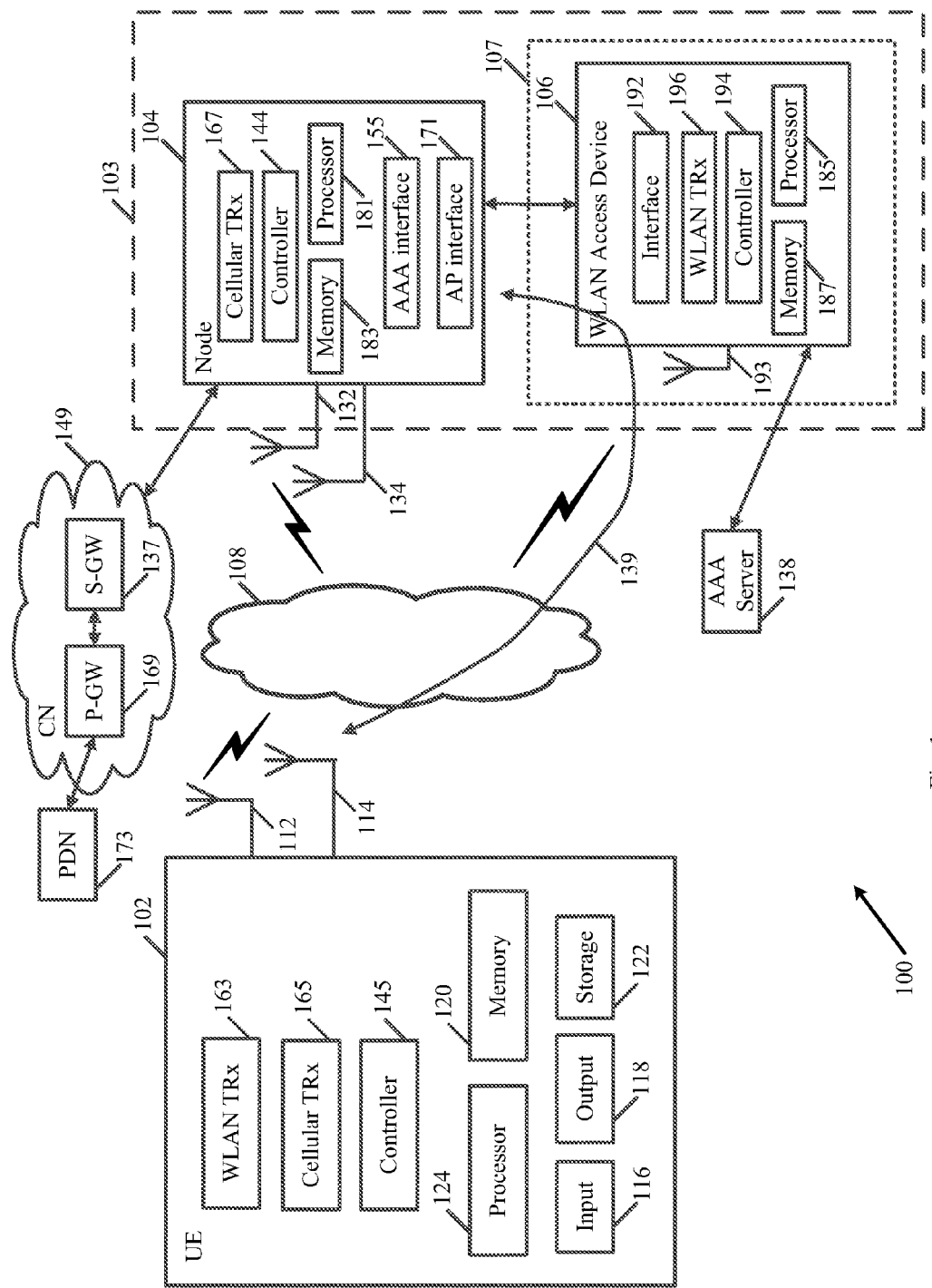
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including TS 36.300 ("3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", V12.1.0, June 2013); 3GPP TS 36.331 (*3GPP TS 36.331 V11.5.0 (2013-09); Technical Specification; 3rd Generation Partnership Project; Technical Specification Group Radio Access Network; Evolved Universal Terrestrial Radio Access (E-UTRA); Radio Resource Control (RRC); Protocol specification (Release 11)*); 3GPP TS 36.321 (*3GPP TS 36.321 V11.4.0 (2013-12); Technical Specification 3rd Generation Partnership Project; Technical Specification Group Radio Access Network; Evolved Universal Terrestrial Radio Access (E-UTRA); Medium Access Control (MAC) protocol specification (Release 11)*); 3GPP TS 36.322 (*3GPP TS 36.322 V11.0.0 (2012-09); Technical Specification; 3rd Generation Partnership Project; Technical Specification Group Radio Access Network; Evolved Universal Terrestrial Radio Access (E-UTRA); Radio Link Control (RLC) protocol specification (Release 11)*); 3GPP TS 36.323 (*3GPP TS 36.323 V11.2.0 (2013-03); Technical Specification; 3rd Generation Partnership Project; Technical Specification Group Radio Access Network; Evolved Universal Terrestrial Radio Access (E-UTRA); Packet Data Convergence Protocol (PDCP) specification (Release 11)*); and 3GPP TS 36.413 (*3GPP TS 36.413 V12.0.0 (2013-12); Technical Specification; 3rd Generation Partnership Project; Technical Specification Group Radio Access Network; Evolved Universal Terrestrial Radio Access Network (E-UTRAN); S1 Application Protocol (S1AP) (Release 12)*)))) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012*), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009*, developed by Task Group m) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Orthogonal Frequency-Division Multiple Access (OFDMA), Spatial Divisional Multiple Access (SDMA), Multi-User (MU) MIMO (MU-MIMO), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments are described herein with respect to a WLAN system. However, other embodiments may be implemented in any other non-cellular network.

Some demonstrative embodiments are described herein with respect to an Access Point (AP). However, other embodiments may be implemented in any other WLAN access device, for example, an Access Controller (AC), e.g., as described below.

Some demonstrative embodiments are described herein with respect to an evolved Node B (eNB). However, other embodiments may be implemented in any other cellular manager, for example, a Radio Network Controller (RNC), e.g., as described below.

Some demonstrative embodiments may be used in conjunction with a Heterogeneous Network (HetNet), which may utilize a deployment of a mix of technologies, frequencies, cell sizes and/or network architectures, e.g., including cellular, millimeter-wave (mmWave), and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrases "WLAN access device" and "WLAN manager" as used herein, may refer to an entity capable of controlling and/or managing WLAN radio access to one or more wired networks. In some embodiments, the WLAN access device may include a WLAN Access Point (AP), e.g., as described below. In one example, the WLAN AP may include an entity that includes a station (STA) and provides access to distribution services, via the Wireless Medium (WM) for associated STAs. In other embodiments, the WLAN access device may include an Access Controller (AC), or any other device.

The term "station" (STA), as used herein, may include any logical entity that is a singly addressable instance of a medium access control (MAC) and a physical layer (PHY) interface to the WM.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network, e.g., including a cell controlled by a cellular node ("node") 104.

In some demonstrative embodiments, system 100 may include a non-cellular network 107, for example, a WLAN, e.g., a Basic Service Set (BSS), managed by a WLAN access device 106, e.g., a WLAN Access Point (AP), or a WLAN Access Controller (AC).

In some demonstrative embodiments, non-cellular network 107 may at least partially be within a coverage area of node 104. For example, WLAN access device 106 may be within a coverage area of node 104.

In some demonstrative embodiments, node 104 may perform the functionality of a cellular manager to control and/or manage communication of UE 102 in cell 103, e.g., as described below.

In some demonstrative embodiments, node 104 may include an Evolved Node B (eNB), e.g., in a LTE system. For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB), a Radio Network Controller (RNC) configured to control at least one Node B, a base station or any other node or device.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or WLAN access device 106 may include one or more wireless communication units and/or modules to perform wireless communication between UE 102, node 104, WLAN access device 106 and/or with one or more other wireless communication devices, e.g., as described below.

In some demonstrative embodiments, UE 102 may include a WLAN Transceiver (TRx) 163, and a cellular TRx 165; WLAN access device 106 may include a WLAN TRx 196; and/or node 104 may include a cellular TRx 167, e.g., as described below.

In some demonstrative embodiments, node 104 may include cellular TRx 167 to communicate directly with UE 102 via a cellular link, for example, if node 104 performs the functionality of an eNB, e.g., as described below. However, in other embodiments, node 104 may include any other communication interface, in addition to or instead of cellular TRx 167, to communicate with UE 102 via a cellular link, e.g., directly or indirectly. In one example, node 104 may perform the functionality of a RNC. According to this example, node 104 may include a Node B interface, e.g., an Interface Unit b (Iub), to communicate with UE 102 via a Node B, which may include a cellular TRx 167, e.g., via a cellular link between the Node B and UE 102.

In some demonstrative embodiments, WLAN access device 106 may include WLAN TRx 196 to communicate directly with UE 102 via a WLAN link, e.g., as described below. However, in other embodiments, WLAN access device 106 may include any other communication interface, in addition to or instead of WLAN TRx 196, to communicate with UE 102 via a WLAN link, e.g., directly or indirectly. In one example, WLAN access device 106 may perform the functionality of an Access Controller (AC). According to this example, WLAN access device 106 may include a Lightweight AP (LAP) interface to communicate with UE 102 via a LAP, which may include WLAN TRx 196, e.g., via a WLAN link between the LAP and UE 102.

In some demonstrative embodiments, UE 102, node 104 and/or WLAN access device 106 may include, or may be associated with, one or more antennas. In one example, UE 102 may be associated with at least two antennas, e.g., antennas 112 and 114, or any other number of antennas, e.g., one antenna or more than two antennas; node 104 may be associated with at least two antennas, e.g., antennas 132 and 134, or any other number of antennas, e.g., one antenna or more than two antennas; and/or WLAN access device 106 be associated with one or more antennas 193.

In some demonstrative embodiments, antennas 112, 114, 132, 134 and/or 193 may include any type of antennas suitable for transmitting and/or receiving wireless communication signals, blocks, frames, transmission streams, packets, messages and/or data. For example, antennas 112, 114, 132, 134 and/or 193 may include any suitable configuration, structure and/or arrangement of one or more antenna elements, components, units, assemblies and/or arrays. For example, antennas 112, 114, 132, 134 and/or 193 may include a phased array antenna, a dipole antenna, a single element antenna, a set of switched beam antennas, and/or the like.

In some embodiments, antennas 112, 114, 132, 134 and/or 193 may implement transmit and receive functionalities using separate transmit and receive antenna elements. In some embodiments, antennas 112, 114, 132, 134 and/or 193 may implement transmit and receive functionalities using common and/or integrated transmit/receive elements.

In some demonstrative embodiments, cellular TRx 165, WLAN TRx 163, cellular TRx 167, and/or WLAN TRx may include one or more wireless transmitters, receivers and/or transceivers able to send and/or receive wireless communication signals, RF signals, frames, blocks, transmission streams, packets, messages, data items, and/or data.

In some demonstrative embodiments, WLAN TRx 147 and WLAN TRx 196 may be configured to communicate between UE 102 and WLAN access device 106 over a WLAN link; and/or cellular TRx 165 and cellular TRx 167 may be configured to communicate between UE 102 and node 104 over a cellular link.

In some demonstrative embodiments, the WLAN link may include, for example, a Wireless Fidelity (WiFi) link, a mmWave link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, or any other frequency band.

In some demonstrative embodiments, cellular TRx 165 and/or cellular TRx 167 may include a multiple input multiple output (MIMO) transmitters receivers system (not shown), which may be capable of performing antenna beamforming methods, if desired. In other embodiments, cellular TRx 165 and/or cellular TRx 167 may include any other transmitters and/or receivers.

In some demonstrative embodiments, cellular TRx 165 and/or cellular TRx 167 may include a turbo decoder and/or a turbo encoder (not shown) for encoding and/or decoding data bits into data symbols, if desired. In other embodiments, cellular TRx 165 and/or cellular TRx 167 may include any other encoder and/or decode.

In some demonstrative embodiments, cellular TRx 165 and/or cellular TRx 167 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104. In other embodiments, cellular TRx 165 and/or cellular TRx 167 may include any other modulators and/or demodulators.

In some demonstrative embodiments, WLAN TRx 163 and/or WLAN TRx 196 may establish a WLAN link between UE 102 and WLAN access device 106. For example, WLAN TRx 163 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from WLAN access device 106 to the one or more STAs. The uplink may include, for example, a unidirectional link from a STA to WLAN access device 106.

In some demonstrative embodiments, UE 102 may include a controller 145 to control one or more functionalities of UE 102, node 104 may include a controller 144 to control one or more functionalities of node 104, and/or WLAN access device 106 may include a controller 194 to control one or more functionalities of WLAN access device 106, e.g., as described below.

In some demonstrative embodiments, controller 145, controller 144, and/or controller 194 may include or may be implemented using suitable circuitry, e.g., controller circuitry, processor circuitry, memory circuitry, and/or any other circuitry, which may be configured to perform at least part of the functionality of controller 145, controller 144, and/or controller 194. Additionally or alternatively, one or more functionalities of controller 145, controller 144, and/or controller 194 may be implemented by logic, which may be executed by a machine and/or one or more processors, e.g., as described below.

In some demonstrative embodiments, UE 102 may also include, for example, one or more of a processor 124, an input unit 116, an output unit 118, a memory unit 120, and a storage unit 122; node 104 may include a processor 181 and/or a memory 183; and/or AP 106 may include a processor 185 and/or a memory 187. UE 102, node 104 and/or WLAN access device 106 may optionally include other suitable hardware components and/or software components. In some demonstrative embodiments, some or all of the components of one or more of UE 102, node 104 and/or WLAN access device 106 may be enclosed in a common housing or packaging, and may be interconnected or operably associated using one or more wired or wireless links. In other embodiments, components of one or more of UE 102, node 104 and/or WLAN access device 106 may be distributed among multiple or separate devices.

Processor 124, processor 181, and/or processor 185 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102 and/or of one or more suitable applications. Processor 181 executes instructions, for example, of an OS of node 104 and/or of one or more suitable applications. Processor 185 executes instructions, for example, of an OS of WLAN access device 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, Light Emitting Diode (LED) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102. Memory 183 may store, for example, data processed by node 104. Memory 187 may store, for example, data processed by WLAN access device 106.

In some demonstrative embodiments, UE 102 may be configured to utilize a cellular connection, e.g., a Long Term Evolution (LTE) cellular connection, a Universal Mobile Telecommunications System (UMTS) connection or any other cellular connection, to communicate with node 104; and a WLAN connection, e.g., a Wireless-Fidelity (WiFi) connection or any other WLAN connection, to communicate with WLAN access device 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi Radio Access technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In some demonstrative embodiments, node 104 and WLAN access device 106 may be implemented as part of a Multi-RAT small cell.

In some demonstrative embodiments, node 104 and WLAN access device 106 may be co-located or connected as part of an Integrated Cellular and WLAN (ICW) multi-RAT small cell.

In some demonstrative embodiments, node 104 and WLAN access device 106 may be configured to interface with one another, for example, to enable node 104 to interact directly with WLAN access device 106 and/or to control one or more functionalities of WLAN access device 106, e.g., as described below.

In some demonstrative embodiments, node 104 may include an AP interface 171 to communicate with WLAN access device 106, and/or WLAN access device 106 may include a cellular manager interface 192 to communicate with node 104, e.g., as described below.

In some demonstrative embodiments, interfaces 171 and 192 may include any suitable interface configured to provide connectivity between WLAN access device 106 and node 104. Interfaces 171 and 196 may include any wired and/or wireless communication links. In one example, interfaces 171 and 196 may be configured to route and/or tunnel communications between node 104 and WLAN access device 106. For example, interfaces 171 and 196 may include an Internet-Protocol (IP) based network, or any other network.

In some embodiments, node 104 and WLAN access device 106 may be implemented in the form of a coupled eNB/WLAN access device, e.g., a coupled eNB/AP.

In some demonstrative embodiments, the coupled eNB/AP may include eNB circuitry configured to perform the functionality of node 104, and WLAN access device circuitry, e.g., AP circuitry configured to perform the functionality of WLAN access device 106, e.g., as described below.

In some embodiments, node 104 and WLAN access device 106 may be implemented as part of a common device, e.g., an integrated eNB/AP device. In other embodiments, node 104 and WLAN access device 106 may be implemented as separate and/or independent units or devices. For example, the coupled eNB/AP may include separate eNB and AP devices, which may be coupled together.

In other embodiments, system 100 may implement any other architecture and/or deployment.

In some demonstrative embodiments, UE 102 may establish a plurality of Evolved Packet-switched System (EPS) bearers to connect between UE 102 and one or more elements of a Core Network (CN) 149 via node 104.

In one example, UE 102 may establish at least one Packet Data Network (PDN) connection between UE 102 and at least one PDN 173, e.g., to support one or more EPS bearers between UE 102 and the PDN 173. The PDN connection may be maintained over a plurality of bearers between UE 102 and the PDN 173. PDN 173 may include, for example, an Internet network, an IP Multimedia Core Network Subsystem (IMS) network, and/or any other network.

In one example, system 100 may include an LTE system, and at least one EPS bearer may be established via the PDN connection between UE 102 and a PDN Gateway (GW) (P-GW) 169 of CN 149. The EPS bearer may include a Data Radio Bearer (DRB) between UE 102 and node 104, a bearer, e.g., a S1 bearer, between node 104 and a Serving Gateway (S-GW) 137 of CN 149, and a bearer, e.g., a S5 bearer, between the S-GW 137 and the P-GW 169. In some implementations, an Evolved UMTS Terrestrial Radio Access Network (E-UTRAN) Radio Access Bearer (E-RAB) may be established between UE 102 and the S-GW 167, e.g., including the DRB and the S1 bearer.

In some demonstrative embodiments, a bearer, e.g., the EPS bearer, may be in the form of a virtual connection, which may provide a bearer service, e.g., a transport service with specific Quality of Service (QoS).

In some demonstrative embodiments, node 104, WLAN access device 106, and/or UE 102 may be configured to enable cellular-WLAN interworking at the radio access network level, e.g., as described below.

In one example, node 104, WLAN access device 106, and/or UE 102 may be configured to provide improved traffic balancing between WLAN access of UE 102 and cellular access of UE 102. Additionally or alternatively, node 104, WLAN access device 106, and/or UE 102 may be configured to enable radio access selection taking into account radio congestion levels, e.g., of the cellular and WLAN links. Additionally or alternatively, node 104, WLAN access device 106, and/or UE 102 may be configured to provide improved battery life of UE 102, and/or to provide any other improvements and/or benefits.

In some demonstrative embodiments, node 104, WLAN access device 106, and/or UE 102 may be configured to enable a tightly coupled cellular-WLAN interworking system architecture, e.g., as described below.

In some demonstrative embodiments, node 104, WLAN access device 106, and/or UE 102 may be configured according to a Multi-Homed Radio Bearer (MHRB) architecture, including a plurality of radio bearer connections ("radio bearer legs") to communicate traffic of a DRB between node 104 and UE 102, e.g., as described below.

In other embodiments, node 104, WLAN access device 106, and/or UE 102 may be configured according to any other architecture.

In some demonstrative embodiments, the MHRB architecture may include two radio bearer legs, for example, including a first radio bearer leg, which may be established over the cellular link between node 104 and UE 102, and a second radio bearer leg, which may be established over the WLAN link between UE 102 and WLAN access device 106, e.g., as described below.

In some demonstrative embodiments, according to the MHRB architecture, the first and second radio bearer legs may be joined together at node 104, for example, in a manner transparent to elements of CN 149, e.g., as described below.

In some demonstrative embodiments, the MHRB architecture may be configured to enable seamless traffic offload between the first and second radio bearer legs, for example, such that packets of an EPS bearer may be steered between the cellular access link and the WLAN access link, e.g., without impacting session continuity.

In some demonstrative embodiments, the radio bearer leg may be established in the form of a point to point (P2P) link between UE 102 and node 104, for example, over the WLAN link between UE 102 and WLAN access device 106, e.g., as described below.

In some demonstrative embodiments, UE 102, node 104, and/or WLAN access device 106 may be configured to enable steering one or more DRBs between UE 102 and node 104 via at least one P2P link 139 between UE 102 and node 104, e.g., formed over the WLAN link between UE 102 and WLAN access device 106, e.g., as described below.

In some demonstrative embodiments, controller 144 may be configured to establish the at least one P2P link 139 with UE 102 via the WLAN link between UE 102 and WLAN access device 106.

In some demonstrative embodiments, node 104 may provide to UE 102 information corresponding to the at least one P2P link 139, for example, to enable UE 102 to establish the P2P link 139 with node 104, e.g., as described below.

In some demonstrative embodiments, node 104 may provide the information corresponding to the P2P link 139 to UE 102 via one or more Radio Resource Control (RRC) messages, which may be communicated over the cellular link between node 104 and UE 102, e.g., as described below.

In some demonstrative embodiments, cellular TRX 167 may send to UE 102 a RRC message including a request to establish the P2P link 139. For example, the RRC message may include WLAN identification information to identify WLAN access device 106, and a transport address of node 104. The transport address of node 104 may include, for example, an address of a termination port at node 104 to be used for the P2P link 139, or any other address to be used by node 104 for the P2P link 139. The WLAN identification information may include, for example, a name of WLAN access device 106, a Service Set Identifier (SSID) of WLAN access device 106, a Basic Service Set Identifier (BSSID) of WLAN access device 106, an address of AP 106, a Media Access Control (MAC) address of WLAN access device 106, or any other identifier to identify the WLAN controlled by WLAN access device 106.

In some demonstrative embodiments, cellular TRx 165 may receive the RRC message, and controller 145 may establish the P2P link 139 with node 104, e.g., based on the WLAN identification information and the transport address.

In some demonstrative embodiments, controllers 144 and 145 may steer the traffic of one or more DRBs from the cellular link between node 104 and UE 102 to the P2P link 139 between node 104 and UE 102, and/or controllers 144 and 145 may steer the traffic of one or more DRBs, which were steered to the P2P link 139, back to the cellular link between node 104 and UE 102.

In some demonstrative embodiments, the ability to steer DRBs, e.g., from the cellular link between UE 102 and node 104, via the P2P link 139 over the WLAN link, may enable improved efficiency, bandwidth utilization, steering and/or offloading of traffic between UE 102 and node 104.

In some demonstrative embodiments, controllers 144 and 145 may steer the traffic of the DRBs between the cellular link and the P2P link 139, for example, while maintaining session continuity.

In some demonstrative embodiments, node 104 and/or UE 102 may be configured to offload traffic from the cellular link to the P2P link 139 on a per-bearer basis, e.g., per-EPS bearer.

In some demonstrative embodiments, an unauthorized entity, for example, an unauthorized UE or any other device capable of communicating with WLAN access device 106, may attempt to mount an attack on node 104, e.g., via the WLAN link with WLAN access device 106. Such an attack on node 104 may, for example, potentially harm one or more elements of CN 149.

In some demonstrative embodiments, UE 102, node 104 and/or WLAN access device 106 may be configured to enable authenticating UE 102 with WLAN access device 106, and/or securing the WLAN link between UE 102 and WLAN access device 106.

Some demonstrative embodiments may be implemented to authenticate UE 102 and/or secure communications of UE 102 over a P2P link, e.g., P2P link 139, between UE 102 and cellular node 104, e.g., as described below. Other embodiments may be implemented to establish any other WLAN link between UE 102 and WLAN access device 106, and/or to authenticate UE 102 and/or secure communications of UE 102 over any other WLAN link.

In some demonstrative embodiments, authenticating UE 102 using a WLAN authentication scheme, which relies on communication and/or interaction with CN 149, may be complex, may not be efficient, may not be optimal, and/or may affect a user Quality of Experience (QoE) of a user of UE 102, e.g., as described below.

In some demonstrative embodiments, a WLAN authentication scheme for 3GPP-WLAN interworking, e.g., as implemented by the 3GPP functionality defined in 3GPP TS 23.402, may be based on communications with a server, e.g., an Authentication, Authorization and Accounting (AAA) server, in CN 149. This WLAN authentication scheme may be complex, inefficient, and/or may not be suitable and/or optimal for some implementations, for example, implementations involving Radio Access Network (RAN) level interworking.

For example, an interface between node 104 and CN 149 may not be efficient, for example, as the interface introduce a delay, which may degrade a user Quality of Experience (QoE). In one example, e.g., in a RAN-level interworking implementation, an eNB, e.g., node 104, may interface a CN, e.g., CN 149, via an interface, e.g., an S1 interface, introduce a delay to performing an authentication procedure to authenticate a UE, e.g., UE 102.

Additionally or alternatively, a WLAN authentication scheme based on WLAN authentication via the server in the CN may impose an increasing burden on the CN, for example, as authentications may be frequent, e.g. due to UE mobility.

In some demonstrative embodiments, UE 102, node 104 and/or WLAN access device 106 may be configured to enable securing a WLAN connection with UE 102, e.g., by authenticating UE 102 and/or encrypting communications with UE 102, for example, even without involving CN 149, e.g., as described below.

In some demonstrative embodiments, node 104 may be configured to provide to UE 102 a UE security key assigned to UE 102.

In some demonstrative embodiments, the UE security key may be used to authenticate UE 102 with WLAN access device 106, e.g., as described below.

In some demonstrative embodiments, the UE security key may be used to encrypt communications between UE 102 and WLAN access device 106, e.g., as described below.

In some demonstrative embodiments, the UE security key may include a master security key, which may be used, for example, to enable authentication, and/or to generate one or more security keys, e.g., an encryption key, an integrity protection key, and the like.

In some demonstrative embodiments, the UE security key may be generated by node 104. For example, controller 144 may be configured to generate the UE security key. In other embodiments, node 104 may receive the UE security key from any other element of system 100, e.g., from WLAN access device 106.

In some demonstrative embodiments, the UE security key may include a key configured to enable authentication of UE 102 with WLAN access device 106 and/or encryption of communications between UE 102 and WLAN access device 106, e.g., as described below.

In some demonstrative embodiments, the UE security key may include a key configured to enable authentication of UE 102 according to an authentication protocol, which may not require using an authentication server and/or interaction with one or more elements of CN 149.

In some demonstrative embodiments, the UE security key may include a key configured to enable authentication of UE 102 according to a WLAN security protocol, and/or a WLAN authentication protocol.

In some demonstrative embodiments, the UE security key may include a random key, e.g., randomly generated by node 104 or WLAN access device 106.

In some demonstrative embodiments, the UE security key may include a pre-shared Key (PSK).

In some demonstrative embodiments, the PSK may include, for example, a WiFi Protected Access (WPA) PSK.

In other embodiments, the UE security key may include any other PSK, or any other security or authentication key.

In some demonstrative embodiments, the UE security key may include a UE-specific security key, which may be specific to UE 102.

In some demonstrative embodiments, the UE security key may be configured to authenticate UEs in a UE-specific manner, e.g., to separately and/or independently authenticate different UEs.

In some demonstrative embodiments, controller 144 may generate a different UE security key, for example, for each UE 102, which may be connected to node 104, and may be able to steer traffic via WLAN access device 106.

In some demonstrative embodiments, controller 144 may generate a different UE security key, for example, for each UE 102, which may be connected to node 104, and may have one or more bearers, which may be allowed to be offloaded to the WLAN ("offloadable bearers").

In some demonstrative embodiments, controller 144 may generate the UE security key as a temporary security key. In one example, controller 144 may generate the UE security key as a one-time key.

In other embodiments, the UE security key may be configured to authenticate a plurality of UEs, e.g., a group of UEs. For example, the group of UEs may include a plurality of UEs belonging to the same user, a plurality of UEs belonging to an organization, and the like.

In some demonstrative embodiments, node 104 may send the UE security key to UE 102, e.g., via the cellular link between node 104 and UE 102.

In some demonstrative embodiments, cellular TRx 167 may transmit to UE 102 a cellular message including the UE security key, e.g., via the cellular link between UE 102 and node 104.

In some demonstrative embodiments, cellular TRx 167 may transmit the cellular message to UE 102, for example, prior to UE 102 establishing a WLAN link with WLAN access device 106, e.g., prior to establishing the P2P link 139 via WLAN access device 106.

In some demonstrative embodiments, cellular TRx 167 may send the UE security key to UE 102 as part of an RRC message.

In some demonstrative embodiments, cellular TRx 167 may send the UE security key to UE 102 as part of the RRC message including the request to establish the P2P link 139.

For example, cellular TRx 167 may send to UE 102 a RRC message including the WLAN identification information to identify WLAN access device 106, e.g., as described above, the transport address of node 104, e.g., as described above, and the UE security key corresponding to UE 102.

In some demonstrative embodiments, cellular TRx 167 may send to UE 102 a RRCConnectionReconfiguration message including the UE security key.

In other embodiments, node 140 may send the UE security key to UE 102 via any other RRC message, and/or using any other communication and/or signaling protocol. In one example, node 140 may send the UE security key to UE 102 via a higher layer protocol, e.g., a Transmission Control Protocol (TCP) and Internet Protocol (IP) (TCP/IP), or any other protocol.

In some demonstrative embodiments, UE 102 may receive the UE security key from node 104. For example, cellular TRx 165 may receive the UE security key from node 104 over the cellular link, e.g., as part of the RRC message described above.

In some demonstrative embodiments, UE 102 may use the UE security key to authenticate with WLAN access device 106 and/or to encrypt communications between UE 102 and WLAN access device 106, e.g., as described below.

In some demonstrative embodiments, controller 145 may use the UE security key to authenticate UE 102 to WLAN access device 106, for example, when establishing the WLAN link with WLAN access device 106, e.g., when establishing P2P link 139 over the WLAN link with WLAN access device 106.

In some demonstrative embodiments, controller 145 may use the UE security key to encrypt traffic of UE 102, for example, when offloading the traffic via the WLAN, or when performing any other communication with WLAN access device 106.

In some demonstrative embodiments, node 104 may be configured to communicate the UE security key of UE 102 with WLAN access device 106, e.g., as described below.

In some demonstrative embodiments, node 104 may be configured to send the UE security key of UE 102 to WLAN access device 106, e.g., if the UE security key of UE 102 is generated by node 104 and/or provided to node 104 by another element of system 100, e.g., as described below. In other embodiments, WLAN access device 106 may be configured to send the UE security key of UE 102 to node 104, e.g., if the UE security key of UE 102 is generated by WLAN access device 106 and/or provided to WLAN access device 106 by another element of system 100, e.g., as described below.

In some demonstrative embodiments, AP interface 171 may send the UE security key of UE 102 to WLAN access device 106.

In some demonstrative embodiments, AP interface 171 may send the UE security key to WLAN access device 106 as part of authentication information (also referred to as "WLAN authentication information", "WLAN security information", or "security information") corresponding to UE 102. For example, the security information may include a WLAN identifier of UE 102, and the UE security key of UE 102.

In some demonstrative embodiments, the WLAN identifier of UE 102 may include any identification information to enable WLAN access device 106 to identify UE 102 over the WLAN.

In some demonstrative embodiments, the WLAN identifier of UE 102 may include a MAC address of UE 102, or any other identification information.

In some demonstrative embodiments, the WLAN identifier of UE 102 may include an authentication identifier of UE 102, e.g., an identifier in accordance with an authentication protocol utilized by WLAN access device 106 to authenticate a device over the WLAN.

In some demonstrative embodiments, node 104 may receive the WLAN identifier of UE 102 from UE 102, e.g., via the cellular link between node 104 and UE 102.

In some demonstrative embodiments, node 104 may transmit to UE 102 an information request message, for example, an RRC message, to request the WLAN identifier of UE 102.

In some demonstrative embodiments, UE 102 may transmit to node 104 an information response message including the WLAN identifier of UE 102, e.g., in response to the information request message.

In some demonstrative embodiments, WLAN access device 106 may receive the security information corresponding to UE 102 from node 104. For example, cellular manager interface 192 may receive the security information corresponding to UE 102 from interface 171.

In other embodiments, the UE security key may be generated by any other element of system 100. In one example, controller 194 of WLAN access device 106 may generate the UE security key, or the UE security key may be provided to WLAN access device 106 from another element of system 100. According to these embodiments, WLAN access device 106 may be configured to send the UE security key to node 104, e.g., using interface 192.

In some demonstrative embodiments, the UE security key may be provided to WLAN access device 106 from a local AAA server 138, e.g., as described below. For example, node 104 and/or WLAN access device 106 may include an AAA interface 155, e.g., a Remote Authentication Dial-In User Service (RADIUS) interface, a Diameter interface, or any other interface, to communicate with AAA server 138.

In some demonstrative embodiments, controller 194 may use the UE security key corresponding to UE 102, e.g., to authenticate UE 102 over the WLAN, and/or to encrypt communications with UE 102 over the WLAN.

In some demonstrative embodiments, controller 194 may use the UE security key corresponding to UE 102 to security UE 102 and/or establish a secure communication link with UE 102.

In some demonstrative embodiments, controller 194 may be configured to filter UEs, for example, based on the WLAN identifier of the UEs, for example, to allow only authentication attempts from UEs for which WLAN identifiers of the UEs have been received.

In some demonstrative embodiments, controller 194 may be configured to authenticate different UEs using different UE security keys.

For example, interface 192 may receive from node 104 a first UE security key assigned to a first UE, and a second UE security key assigned to a second UE, the second UE security key being different from the first UE security key. According to this example, controller 194 may authenticate the first UE using the first UE security key, and may authenticate the second UE using the second UE security key.

In some demonstrative embodiments, node 104 may send the UE security key to UE 102 via the cellular link, which may provide connectivity with UE 102, e.g., even when UE 102 is not connected to the WLAN. Node 104 may communicate the UE security key with WLAN access device 106 via the interface between node 104 and WLAN access device 106, which may be proprietary, standardized, and/or secured.

In some demonstrative embodiments, the UE security key provided from node 104 to UE 102 may be implemented, for example, to facilitate a node-triggered offloading of traffic of UE 102 to the WLAN, e.g., which may be triggered and/or controlled by node 104. For example, controller 144 may decide to offload traffic of at least one bearer of UE 102 to the WLAN. According to this example, controller 144 may send to UE 102 the UE security key, together with a command instructing UE 102 to offload the traffic to WLAN access device 106.

In some demonstrative embodiments, the UE security key provided from node 104 to UE 102 may be implemented, for example, to facilitate a UE-triggered offloading of traffic of UE 102 to the WLAN, e.g., which may be triggered and/or controlled by UE 102. For example, cellular TRx 167 may send the UE security key to UE 102, e.g., in advance, for example, to enable UE to authenticate with WLAN access device 106, e.g., when controller 145 decides to offload traffic of UE 102 to the WLAN.

Figure 2:
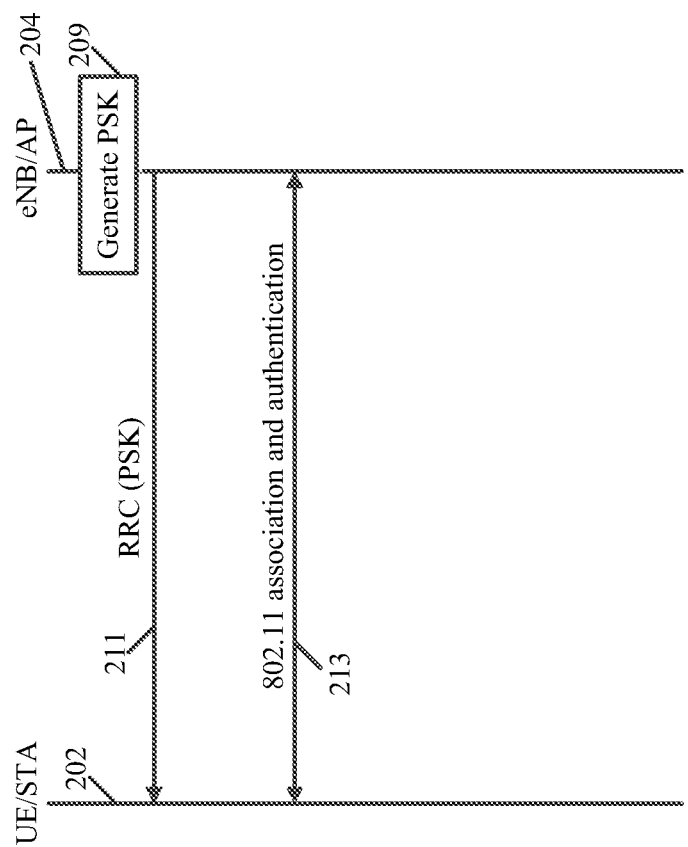
FIG. 2 is a schematic illustration of a sequence diagram of operations performed by a User Equipment (UE), and a coupled evolved Node B (eNB) Access Point (AP) (eNB/AP), in accordance with some demonstrative embodiments.

Reference is made to FIG. 2, which illustrates a sequence diagram of operations performed by a UE, and a coupled eNB/AP 204, in accordance with some demonstrative embodiments. For example, UE 202 may perform the functionality of UE 102 (FIG. 1), and/or coupled eNB/AP 204 may perform the functionality of node 104 and WLAN access device 106 (FIG. 1).

In some demonstrative embodiments, eNB/AP 204 may generate a UE security key 209, e.g., a PSK or any other key. The eNB/AP 204 may generate the security key 209, for example, in a random manner. In one example, the UE security key 209 may include a random, one-time, key.

In some demonstrative embodiments, eNB/AP 204 may generate the UE security key, for example, for a UE, e.g., for every UE, which may connect to the WLAN AP of eNB/AP 204. In one example, controller 144 (FIG. 1) may generate the UE security key 209, e.g., as described above.

In some demonstrative embodiments, eNB/AP 204 may send a message 211 to UE 202, e.g., via RRC signaling or any other signaling protocol. The message 211 may include the security key 209 corresponding to UE 202. For example, cellular TRx 167 may transmit the security key 209 to UE 202, for example, as part of an RRC message, or any other message, e.g., as described above.

In some demonstrative embodiments, UE 202 may associate and authenticate (213) with the WLAN AP of eNB/AP 204, for example, using the UE security key 209. In one example, UE 202 may use the security key 209 to associate and authenticate with the WLAN AP, for example, according to a WLAN association and/or authentication procedure.

Figure 3:
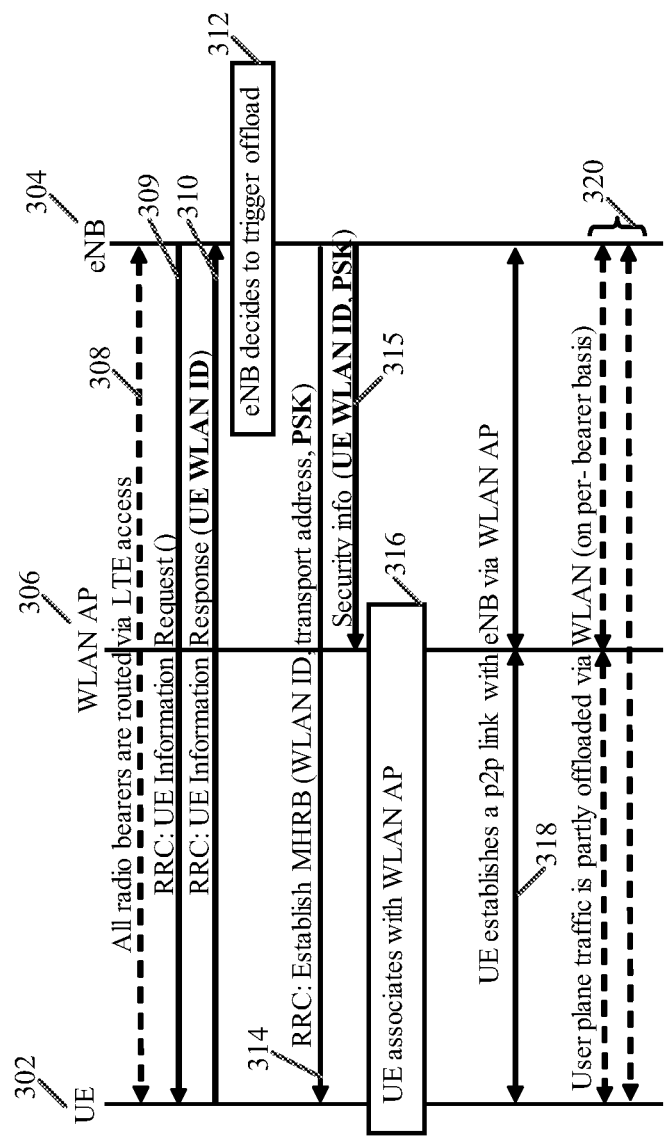
FIG. 3 is a schematic illustration of a sequence diagram of operations performed by a UE, a Wireless Local Area Network (WLAN) AP, and an eNB, in accordance with some demonstrative embodiments.

Reference is made to FIG. 3, which schematically illustrates a sequence diagram of operations performed by a UE 302, a WLAN AP 306, and an eNB 304, in accordance with some demonstrative embodiments. For example, UE 302 may perform the functionality of UE 102 (FIG. 1), WLAN AP 306 may perform the functionality of WLAN access device 106 (FIG. 1), and/or eNB 304 may perform the functionality of node 104 (FIG. 1).

In some demonstrative embodiments, UE 302 and eNB 304 may communicate (310) a plurality of DRBs via LTE access, e.g., via a cellular link between UE 302 and eNB 304.

In some demonstrative embodiments, eNB 304 may send an RRC information request message 309 to UE 302. For example, information request message 309 may include a request for a WLAN identifier of UE 302. In one example, cellular TRx 167 (FIG. 1) may send the information request message 309 to UE 102 (FIG. 1), e.g., as described above.

In some demonstrative embodiments, UE 302 may send to eNB 304 an RRC information response message 310 including the WLAN identifier of UE 302, e.g., in response to the information request message 309. For example, cellular TRx 165 may transmit the information response message 310 to node 104 (FIG. 1), e.g., as described above.

In some demonstrative embodiments, eNB 304 may decide (312) to trigger offloading of one or more DRBs to one or more P2P links via WLAN AP 306, e.g., using a MHRB scheme.

In some demonstrative embodiments, eNB 304 may decide to trigger the offloading of the one or more DRBs based on any suitable criteria.

In one example, controller 144 (FIG. 1) may make an offloading decision to offload one or more DRBs based, for example, on a location of UE 302, and pre-configured knowledge of appropriate WLAN access points in a vicinity of UE 302.

In another example, controller 144 (FIG. 1) may make an offloading decision to offload one or more DRBs based, for example, on measurement information, e.g., including WLAN measurements corresponding to the WLAN, which may be received, for example, from UE 102.

In another example, the offloading decision may be based on knowledge, at eNB 304, of a real-time load status of WLAN AP 306, a load status of a cell controlled by eNB 304, and/or any other parameter and/or criterion. In one example, eNB 304 may obtain the load status of WLAN AP 306 based, for example, on measurements performed by UE 302, via operations, administration and maintenance (OAM) messages, and/or via a direct interface between eNB 304 and WLAN AP 306.

In some demonstrative embodiments, eNB 304 may select the one or more DRBs to be offloaded, for example, based on a QoS parameter associated with the DRBs.

For example, eNB 304 may select whether or not to offload a DRB from the cellular link to the WLAN link, for example, based on a QoS Class Identifier (QCI) assigned to an EPS bearer associated with the DRB. In one example, eNB 304 may select to offload one or more DRBs, which are associated with EPS bearers having one or more particular QCIs.

In other embodiments, eNB 304 may select the one or more DRBs to be offloaded, based on any other additional or alternative criterion.

In some demonstrative embodiments, eNB 304 may send an RRC message 314, e.g., an Establish MHRB message, to request UE 302 to trigger offloading to the WLAN.

In some demonstrative embodiments, RRC message 314 may include a security key, for example, a PSK, e.g., a WPA-PSK or any other key, corresponding to UE 302. For example, controller 144 (FIG. 1) may generate the security key corresponding to UE 302, e.g., as described above.

In some demonstrative embodiments, RRC message 314 may include a WLAN Identifier (ID) to identify WLAN AP 306, e.g., a Service Set ID (SSID) address of WLAN AP 306, a Basic SSID (BSSID) address of WLAN AP 306, or any other address or identifier.

In some demonstrative embodiments, RRC message 314 may include a transport address of eNB 304 to be used as a termination point of a P2P link between eNB 304 and UE 302. The transport address may include, for example, a virtual Media Access Control (MAC) address, a Virtual Local Area Network (VLAN) tag ID, a Generic Routing Encapsulation (GRE) tunnel key, or any other type of address.

In some demonstrative embodiments, eNB 304 may provide to WLAN AP 306 security information 315 corresponding to UE 302. For example, the security information 315 may include the WLAN ID of UE 302, e.g., as received from UE 302; and the security key, e.g., the WPA-PSK, corresponding to UE 302. For example, interface 171 (FIG. 1) may send the security information to WLAN AP 306, e.g., as described above.

In some demonstrative embodiments, AAA server 138 (FIG. 1) may be located in proximity to eNB 304. In one example, the WLAN authentication of UE 302 may be based, for example, on an authentication protocol, e.g., a 802.1X protocol, between the UE 302 and AAA server 138 (FIG. 1). For example, eNB 304 may "push" the UE WLAN ID of UE 302 and the PSK corresponding to the WLAN ID of UE 302 to the local AAA server 138 (FIG. 1), e.g., via interface 155 (FIG. 1). In another example, eNB 304 may "push" only the UE WLAN ID of UE 302, whereas the PSK corresponding to the UE WLAN ID may be, for example, generated by the AAA server 138 (FIG. 1) and returned to interface 155 (FIG. 1) of eNB 304. The WLAN authentication of UE 302 may be performed, for example, between UE 302 and the AAA server 138 (FIG. 1), for example, via AP 306, which may pass authentication messages between UE 302 and the AAA server 138 (FIG. 1).

In some demonstrative embodiments, UE 302 may search, associate and authenticate (316) with WLAN AP 306, e.g., based on the WLAN ID and the security key in RRC message 314.

In some demonstrative embodiments, UE 302 may trigger establishment (318) of a P2P link, via the WLAN link with WLAN AP 306, to the transport address of eNB 306, e.g., based on the information included in RRC message 314.

In some demonstrative embodiments, UE 302 and/or eNB 304 may steer (320) traffic of one or more of the DRBs to the WLAN.

In some demonstrative embodiments, eNB 304 or UE 302 may be in charge of traffic steering, e.g., in charge of selecting the radio access technology on which to forward the traffic of one or more DRB. eNB 304 or UE 302 may also perform access network selection, e.g., to select which WLAN AP should be used by UE 302.

Figure 4:
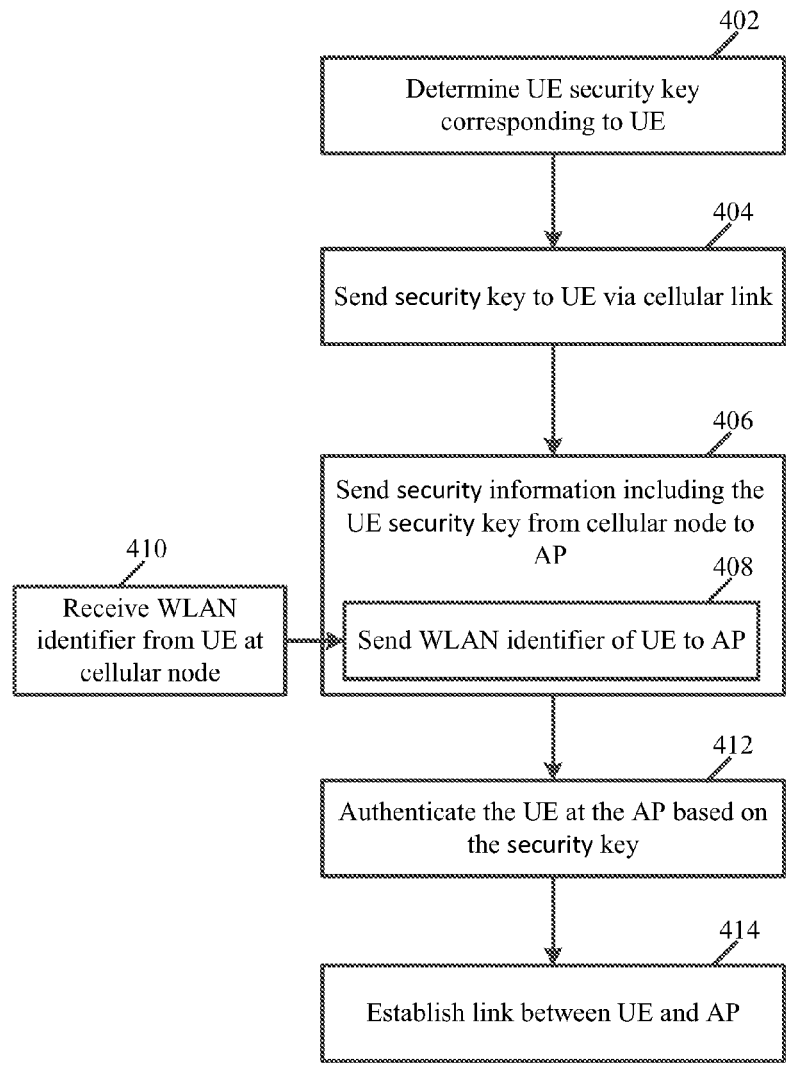
FIG. 4 is a schematic illustration of a method of securing communications of a UE in a WLAN, in accordance with some demonstrative embodiments.

Reference is made to FIG. 4, which schematically illustrates a method of securing communications of a UE in a WLAN, in accordance with some demonstrative embodiments. In some embodiments, one or more of the operations of the method of FIG. 4 may be performed by system 100 (FIG. 1), UE 102 (FIG. 1), node 104 (FIG. 1), WLAN access device 106 (FIG. 1), controller 145 (FIG. 1), controller 144 (FIG. 1), and/or controller 194 (FIG. 1).

As indicated at block 404, the method may include selecting one or more DRBs to be enabled for offloading to a WLAN link. For example, node 104 (FIG. 1) may select one or more DRBs to be enabled for offloading to one or more P2P links 139 (FIG. 1), e.g., as described above.

As indicated at block 402, the method may include determining a security key corresponding to a UE. For example, controller 144 (FIG. 1) may generate the UE security key corresponding to UE 102 (FIG. 1), e.g., as described above.

As indicated at block 404, the method may include communicating the security key from a cellular node to the UE via a cellular link. For example, cellular TRx 167 (FIG. 1) may transmit the security key to UE 102 (FIG. 1), and cellular TRx 165 (FIG. 1) may receive the security key of UE 102 (FIG. 1) at UE 102 (FIG. 1), e.g., as described above.

As indicated at block 406, the method may include sending security information including the security key of the UE from the cellular node to a WLAN AP. For example, node 104 (FIG. 1) may send the security key of UE 102 (FIG. 1) to WLAN access device 106 (FIG. 1), e.g., as described above.

As indicated at block 408, communicating the security information may include sending a WLAN identifier of the UE from the cellular node to the WLAN AP. For example, the method may include receiving at the cellular node the WLAN identifier of the UE from the UE, as indicated at block 410.

As indicated at block 412, the method may include authenticating the UE at the WLAN AP based on the UE security key. For example, controller 194 (FIG. 1) may authenticate UE 102 (FIG. 1), based on the security key corresponding to UE 102 (FIG. 1), e.g., as described above.

As indicated at block 414, the method may include establishing a WLAN link. For example, UE 102 (FIG. 1) and node 104 (FIG. 1) may establish a WLAN link with WLAN device 106 (FIG. 1), e.g., a P2P link 139 (FIG. 1) via the WLAN link between UE 102 (FIG. 1) and WLAN access device 106 (FIG. 1), e.g., as described above.

Figure 5:
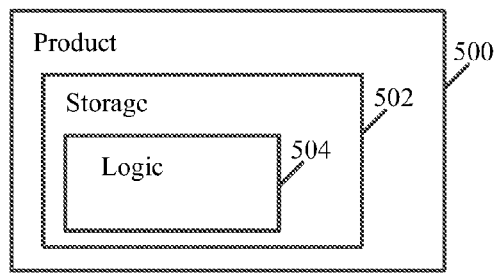
FIG. 5 is a schematic illustration of a product, in accordance with some demonstrative embodiments.

FIG. 5 is a schematic illustration of a product of manufacture, in accordance with some demonstrative embodiments. Product 500 may include a non-transitory machine-readable storage medium 502 to store logic 504, which may be used, for example, to perform at least part of the functionality of UE 102 (FIG. 1), node 104 (FIG. 1), WLAN access device 106 (FIG. 1), controller 144 (FIG. 1), controller 145, and/or controller 194 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver; a cellular transceiver to receive a cellular message from a cellular node via a cellular link, the cellular message including a UE security key; and a controller to establish a connection with a WLAN Access Point (AP) based on the UE security key.

Example 2 includes the subject matter of Example 1, and optionally, wherein the cellular transceiver is to receive from the cellular node a Radio Resource Control (RRC) message including the UE security key.

Example 3 includes the subject matter of Example 1 or 2, and optionally, wherein the cellular transceiver is to send to the cellular node a WLAN identifier of the UE, the WLAN transceiver is to use the WLAN identifier of the UE to establish the connection with the WLAN AP.

Example 4 includes the subject matter of Example 3, and optionally, wherein the WLAN identifier of the UE comprises a Media Access Control (MAC) address of the UE, or an authentication identifier of the UE.

Example 5 includes the subject matter of Example 3 or 4, and optionally, wherein the cellular transceiver is to receive an information request message from the cellular node, and to transmit to the cellular node an information response message in response to the information request message, the information response message including the WLAN identifier of the UE.

Example 6 includes the subject matter of any one of Examples 1-4, and optionally, wherein the cellular transceiver is to receive from the cellular node a request to establish a Point to Point (P2P) with the cellular node via the WLAN AP, the request to establish the P2P link including the UE security key.

Example 7 includes the subject matter of any one of Examples 1-6, and optionally, wherein the UE security key comprises a pre-shared key (PSK).

Example 8 includes the subject matter of Example 7, and optionally, wherein the PSK comprises a Wireless-Fidelity Protected Access (WPA) PSK.

Example 9 includes the subject matter of any one of Examples 1-8, and optionally, wherein the controller is to authenticate the UE with the WLAN AP based on the UE security key.

Example 10 includes the subject matter of any one of Examples 1-9, and optionally, wherein the controller is to encrypt communications with the WLAN AP based on the UE security key.

Example 11 includes the subject matter of any one of Examples 1-10, and optionally, comprising one or more antennas, a memory and a processor.

Example 12 includes an evolved Node B (eNB) comprising an access device interface to communicate security information corresponding to a User Equipment (UE) with a Wireless Local Area Network (WLAN) access device, the security information including a WLAN identifier of the UE and a UE security key assigned to the UE; and a cellular transceiver to transmit to the UE a cellular message via a cellular link, the cellular message including the UE security key, and WLAN identification information to identify the WLAN access device.

Example 13 includes the subject matter of Example 12, and optionally, comprising a controller to establish a Point-to-Point (P2P) link with the UE via the WLAN access device, the cellular message including a request to establish the P2P link, and a transport address of the eNB.

Example 14 includes the subject matter of Example 12 or 13, and optionally, wherein the cellular message comprises a Radio Resource Control (RRC) message from the eNB to the UE.

Example 15 includes the subject matter of any one of Examples 12-14, and optionally, wherein the WLAN identifier of the UE comprises a Media Access Control (MAC) address of the UE, or an authentication identifier of the UE.

Example 16 includes the subject matter of any one of Examples 12-15, and optionally, wherein the cellular transceiver is to transmit to the UE an information request message, and to receive from the UE an information response message in response to the information request message, the information response message including the WLAN identifier of the UE.

Example 17 includes the subject matter of any one of Examples 12-16, and optionally, wherein the access device interface is to send the UE security key to the WLAN access device.

Example 18 includes the subject matter of any one of Examples 12-16, and optionally, wherein the access device interface is to receive the UE security key from the WLAN access device.

Example 19 includes the subject matter of any one of Examples 12-16, and optionally, comprising an Authentication, Authorization and Accounting (AAA) interface to send the WLAN identification information to a local AAA server.

Example 20 includes the subject matter of Example 19, and optionally, wherein the AAA interface is to communicate the UE security key with the AAA server.

Example 21 includes the subject matter of any one of Examples 12-20, and optionally, wherein the UE security key comprises a random key.

Example 22 includes the subject matter of any one of Examples 12-21, and optionally, wherein the UE security key comprises a pre-shared key (PSK).

Example 23 includes the subject matter of Example 22, and optionally, wherein the PSK comprises a Wireless-Fidelity Protected Access (WPA) PSK.

Example 24 includes the subject matter of any one of Examples 12-23, and optionally, comprising one or more antennas, a memory, and a processor.

Example 25 includes a Wireless Local Area Network (WLAN) access device comprising a cellular manager interface to communicate security information corresponding to a User Equipment (UE) with a cellular manager, the security information including a WLAN identifier of the UE, and a UE security key assigned to the UE; a WLAN transceiver to communicate with the UE; and a controller to establish a communication link with the UE, based on the UE security key.

Example 26 includes the subject matter of Example 25, and optionally, wherein the cellular manager interface is to communicate a first UE security key assigned to a first UE, and a second UE security key assigned to a second UE, the second UE security key being different from the first UE security key.

Example 27 includes the subject matter of Example 25 or 26, and optionally, wherein the communication link comprises a Point-to-Point (P2P) link between the UE and the cellular node.

Example 28 includes the subject matter of any one of Examples 25-27, and optionally, wherein the WLAN identifier of the UE comprises a Media Access Control (MAC) address of the UE, or an authentication identifier of the UE.

Example 29 includes the subject matter of any one of Examples 25-28, and optionally, wherein the controller is to authenticate the UE based on the UE security key.

Example 30 includes the subject matter of any one of Examples 25-29, and optionally, wherein the controller is to encrypt communications with the UE based on the UE security key.

Example 31 includes the subject matter of any one of Examples 25-30, and optionally, wherein the controller is to authenticate the UE using a local Authentication, Authorization and Accounting (AAA) server.

Example 32 includes the subject matter of any one of Examples 25-31, and optionally, wherein the cellular manager comprises an Evolved Node B (eNB).

Example 33 includes the subject matter of any one of Examples 25-32, and optionally, wherein the cellular manager interface is to receive the UE security key from the cellular manager.

Example 34 includes the subject matter of any one of Examples 25-32, and optionally, wherein the cellular manager interface is to send the UE security key to the cellular manager.

Example 35 includes the subject matter of any one of Examples 25-34, and optionally, wherein the UE security key comprises a random key.

Example 36 includes the subject matter of any one of Examples 25-35, and optionally, wherein the UE security key comprises a pre-shared key (PSK).

Example 37 includes the subject matter of Example 36, and optionally, wherein the PSK comprises a Wireless-Fidelity Protected Access (WPA) PSK.

Example 38 includes the subject matter of any one of Examples 25-37 being an Access Point (AP) or an Access Controller (AC).

Example 39 includes the subject matter of any one of Examples 25-38, and optionally, comprising one or more antennas, a memory, and a processor.

Example 40 includes a system of wireless communication, the system comprising Evolved Node B (eNB) circuitry to transmit to a User Equipment (UE) a cellular message including a UE security key; and Wireless Local Area Network (WLAN) access device circuitry to receive from the eNB circuitry security information including the UE security key, the WLAN access device circuitry to establish a WLAN link with the UE based on the UE security key.

Example 41 includes the subject matter of Example 40, and optionally, wherein the cellular message comprises a Radio Resource Control (RRC) message.

Example 42 includes the subject matter of Example 40 or 41, and optionally, wherein the eNB circuitry is to receive an identifier of the UE from the UE, and to send the identifier of the UE to the WLAN access device circuitry.

Example 43 includes the subject matter of Example 42, and optionally, wherein the identifier of the UE comprises a Media Access Control (MAC) address of the UE, or an authentication identifier of the UE.

Example 44 includes the subject matter of Example 42 or 43, and optionally, wherein the eNB circuitry is to transmit an information request message to the UE, and to receive from the UE an information response message in response to the information request message, the information response message including the identifier of the UE.

Example 45 includes the subject matter of any one of Examples 40-44, and optionally, wherein the eNB circuitry is to transmit to the UE a request to establish a Point-to-Point (P2P) link between the UE and the eNB circuitry, the request to establish the P2P link including the UE security key.

Example 46 includes the subject matter of any one of Examples 40-45, and optionally, wherein the UE security key comprises a random key.

Example 47 includes the subject matter of any one of Examples 40-46, and optionally, wherein the UE security key comprises a pre-shared key (PSK).

Example 48 includes the subject matter of Example 47, and optionally, wherein the PSK comprises a Wireless-Fidelity Protected Access (WPA) PSK.

Example 49 includes the subject matter of any one of Examples 40-48, and optionally, comprising an integrated eNB Access Point (eNB/AP) including the eNB circuitry and the WLAN access device circuitry.

Example 50 includes the subject matter of any one of Examples 40-49, and optionally, comprising one or more antennas, a memory and a processor.

Example 51 includes a method to be performed at a User Equipment (UE), the method comprising receiving a cellular message from a cellular node via a cellular link, the cellular message including a UE security key; and establishing a link with a Wireless Local Area Network (WLAN) Access Point (AP) based on the UE security key.

Example 52 includes the subject matter of Example 51, and optionally, comprising receiving from the cellular node a Radio Resource Control (RRC) message including the UE security key.

Example 53 includes the subject matter of Example 51 or 52, and optionally, comprising sending to the cellular node a WLAN identifier of the UE, and using the WLAN identifier of the UE to connect with the WLAN AP.

Example 54 includes the subject matter of Example 53, and optionally, wherein the WLAN identifier of the UE comprises a Media Access Control (MAC) address of the UE, or an authentication identifier of the UE.

Example 55 includes the subject matter of Example 53 or 54, and optionally, comprising receiving an information request message from the cellular node, and transmitting to the cellular node an information response message in response to the information request message, the information response message including the WLAN identifier of the UE.

Example 56 includes the subject matter of any one of Examples 51-55, and optionally, comprising receiving from the cellular node a request to establish a Point to Point (P2P) link with the cellular node, the request to establish the P2P link including the UE security key.

Example 57 includes the subject matter of any one of Examples 51-56, and optionally, wherein the UE security key comprises a pre-shared key (PSK).

Example 58 includes the subject matter of Example 57, and optionally, wherein the PSK comprises a Wireless-Fidelity Protected Access (WPA) PSK.

Example 59 includes the subject matter of any one of Examples 51-58, and optionally, comprising authenticating the UE with the WLAN AP based on the UE security key.

Example 60 includes the subject matter of any one of Examples 51-59, and optionally, comprising encrypting communications between the UE and the WLAN AP based on the UE security key.

Example 61 includes a method to be performed at an evolved Node B (eNB), the method comprising communicating security information corresponding to a User Equipment (UE) with a Wireless Local Area Network (WLAN) access device, the security information including a WLAN identifier of the UE and a UE security key assigned to the UE; and transmitting to the UE a cellular message via a cellular link, the cellular message including the UE security key, and WLAN identification information to identify the WLAN access device.

Example 62 includes the subject matter of Example 61, and optionally, comprising establishing a Point-to-Point (P2P)

link with the UE via the WLAN access device, the cellular message including a request to establish the P2P link, and a transport address of the eNB.

Example 63 includes the subject matter of Example 61 or 62, and optionally, wherein the cellular message comprises a Radio Resource Control (RRC) message from the eNB to the UE.

Example 64 includes the subject matter of any one of Examples 61-63, and optionally, wherein the WLAN identifier of the UE comprises a Media Access Control (MAC) address of the UE, or an authentication identifier of the UE.

Example 65 includes the subject matter of any one of Examples 61-64, and optionally, comprising transmitting to the UE an information request message, and receiving from the UE an information response message in response to the information request message, the information response message including the WLAN identifier of the UE.

Example 66 includes the subject matter of any one of Examples 61-65, and optionally, comprising sending the UE security key to the WLAN access device.

Example 67 includes the subject matter of any one of Examples 61-65, and optionally, comprising receiving the UE security key from the WLAN access device.

Example 68 includes the subject matter of any one of Examples 61-67, and optionally, wherein the UE security key comprises a random key.

Example 69 includes the subject matter of any one of Examples 61-68, and optionally, wherein the UE security key comprises a pre-shared key (PSK).

Example 70 includes the subject matter of Example 69, and optionally, wherein the PSK comprises a Wireless-Fidelity Protected Access (WPA) PSK.

Example 71 includes a method to be performed at a Wireless Local Area Network (WLAN) access device, the method comprising communicating security information corresponding to a User Equipment (UE) with a cellular manager, the security information including a WLAN identifier of the UE and a UE security key assigned to the UE; and establishing a WLAN link with the UE, based the UE security key.

Example 72 includes the subject matter of Example 71, and optionally, comprising communicating with the cellular manager a first UE security key assigned to a first UE, and a second UE security key assigned to a second UE, the second UE security key being different from the first UE security key.

Example 73 includes the subject matter of Example 71 or 72, and optionally, wherein the WLAN link comprises a Point-to-Point (P2P) link between the UE and the cellular node.

Example 74 includes the subject matter of any one of Examples 71-73, and optionally, wherein the WLAN identifier of the UE comprises a Media Access Control (MAC) address of the UE, or an authentication identifier of the UE.

Example 75 includes the subject matter of any one of Examples 71-74, and optionally, comprising authenticating the UE via a local Authentication, Authorization and Accounting (AAA) server.

Example 76 includes the subject matter of any one of Examples 71-75, and optionally, wherein the cellular manager comprises an Evolved Node B (eNB).

Example 77 includes the subject matter of any one of Examples 71-76, and optionally, comprising receiving the UE security key from the cellular manager.

Example 78 includes the subject matter of any one of Examples 71-76, and optionally, comprising sending the UE security key to the cellular manager.

Example 79 includes the subject matter of any one of Examples 71-78, and optionally, wherein the UE security key comprises a random key.

Example 80 includes the subject matter of any one of Examples 71-79, and optionally, wherein the UE security key comprises a pre-shared key (PSK).

Example 81 includes the subject matter of Example 80, and optionally, wherein the PSK comprises a Wireless-Fidelity Protected Access (WPA) PSK.

Example 82 includes the subject matter of any one of Examples 71-81, and optionally, comprising authenticating the UE based on the UE security key.

Example 83 includes the subject matter of any one of Examples 71-82, and optionally, comprising encrypting communications with the UE based on the UE security key.

Example 84 includes a method to be performed at an integrated evolved Node B (eNB) Access Point (AP) (eNB/AP), the method comprising transmitting to a User Equipment (UE) a cellular message including a UE security key; authenticating the UE at the AP based on the UE security key; and establishing a Wireless Local Area Network (WLAN) link with the UE.

Example 85 includes the subject matter of Example 84, and optionally, wherein the cellular message comprises a Radio Resource Control (RRC) message.

Example 86 includes the subject matter of Example 84 or 85, and optionally, comprising receiving at the eNB an identifier of the UE from the UE, and sending the identifier of the UE to the AP.

Example 87 includes the subject matter of Example 86, and optionally, wherein the identifier of the UE comprises a Media Access Control (MAC) address of the UE, or an authentication identifier of the UE.

Example 88 includes the subject matter of Example 86 or 87, and optionally, comprising transmitting an information request message from the eNB to the UE, and receiving from the UE an information response message in response to the information request message, the information response message including the identifier of the UE.

Example 89 includes the subject matter of any one of Examples 84-88, and optionally, comprising transmitting from the eNB to the UE a request to establish a Point to Point (P2P) link between the eNB and the UE, the request to establish the P2P link including the UE security key.

Example 90 includes the subject matter of any one of Examples 84-89, and optionally, wherein the UE security key comprises a pre-shared key (PSK).

Example 91 includes the subject matter of Example 90, and optionally, wherein the PSK comprises a Wireless-Fidelity Protected Access (WPA) PSK.

Example 92 includes a product including one or more tangible computer-readable non-transitory storage media comprising computer-executable instructions operable to, when executed by at least one computer processor, enable the at least one computer processor to implement a method at a User Equipment (UE), the method comprising receiving a cellular message from a cellular node via a cellular link, the cellular message including a UE security key; and establishing a link with a Wireless Local Area Network (WLAN) Access Point (AP) based on the UE security key.

Example 93 includes the subject matter of Example 92, and optionally, wherein the method comprises receiving from the cellular node a Radio Resource Control (RRC) message including the UE security key.

Example 94 includes the subject matter of Example 92 or 93, and optionally, wherein the method comprises sending to the cellular node a WLAN identifier of the UE, and using the WLAN identifier of the UE to connect with the WLAN AP.

Example 95 includes the subject matter of Example 94, and optionally, wherein the WLAN identifier of the UE comprises a Media Access Control (MAC) address of the UE, or an authentication identifier of the UE.

Example 96 includes the subject matter of Example 94 or 95, and optionally, wherein the method comprises receiving an information request message from the cellular node, and transmitting to the cellular node an information response message in response to the information request message, the information response message including the WLAN identifier of the UE.

Example 97 includes the subject matter of any one of Examples 92-96, and optionally, wherein the method comprises receiving from the cellular node a request to establish a Point to Point (P2P) link with the cellular node, the request to establish the P2P link including the UE security key.

Example 98 includes the subject matter of any one of Examples 92-97, and optionally, wherein the UE security key comprises a pre-shared key (PSK).

Example 99 includes the subject matter of Example 98, and optionally, wherein the PSK comprises a Wireless-Fidelity Protected Access (WPA) PSK.

Example 100 includes the subject matter of any one of Examples 92-99, and optionally, wherein the method comprises authenticating the UE with the WLAN AP based on the UE security key.

Example 101 includes the subject matter of any one of Examples 92-100, and optionally, wherein the method comprises encrypting communications between the UE and the WLAN AP based on the UE security key.

Example 102 includes a product including one or more tangible computer-readable non-transitory storage media comprising computer-executable instructions operable to, when executed by at least one computer processor, enable the at least one computer processor to implement a method at an evolved Node B (eNB), the method comprising communicating security information corresponding to a User Equipment (UE) with a Wireless Local Area Network (WLAN) access device, the security information including a WLAN identifier of the UE and a UE security key assigned to the UE; and transmitting to the UE a cellular message via a cellular link, the cellular message including the UE security key, and WLAN identification information to identify the WLAN access device.

Example 103 includes the subject matter of Example 102, and optionally, wherein the method comprises establishing a Point-to-Point (P2P) link with the UE via the WLAN access device, the cellular message including a request to establish the P2P link, and a transport address of the eNB.

Example 104 includes the subject matter of Example 102 or 103, and optionally, wherein the cellular message comprises a Radio Resource Control (RRC) message from the eNB to the UE.

Example 105 includes the subject matter of any one of Examples 102-104, and optionally, wherein the WLAN identifier of the UE comprises a Media Access Control (MAC) address of the UE, or an authentication identifier of the UE.

Example 106 includes the subject matter of any one of Examples 102-105, and optionally, wherein the method comprises transmitting to the UE an information request message, and receiving from the UE an information response message in response to the information request message, the information response message including the WLAN identifier of the UE.

Example 107 includes the subject matter of any one of Examples 102-106, and optionally, wherein the method comprises sending the UE security key to the WLAN access device.

Example 108 includes the subject matter of any one of Examples 102-106, and optionally, wherein the method comprises receiving the UE security key from the WLAN access device.

Example 109 includes the subject matter of any one of Examples 102-108, and optionally, wherein the UE security key comprises a random key.

Example 110 includes the subject matter of any one of Examples 102-109, and optionally, wherein the UE security key comprises a pre-shared key (PSK).

Example 111 includes the subject matter of Example 110, and optionally, wherein the PSK comprises a Wireless-Fidelity Protected Access (WPA) PSK.

Example 112 includes a product including one or more tangible computer-readable non-transitory storage media comprising computer-executable instructions operable to, when executed by at least one computer processor, enable the at least one computer processor to implement a method at a Wireless Local Area Network (WLAN) Access Point (AP), the method comprising communicating security information corresponding to a User Equipment (UE) with a cellular manager, the security information including a WLAN identifier of the UE and a UE security key assigned to the UE; and establishing a WLAN link with the UE, based the UE security key.

Example 113 includes the subject matter of Example 112, and optionally, wherein the method comprises communicating with the cellular manager a first UE security key assigned to a first UE, and a second UE security key assigned to a second UE, the second UE security key being different from the first UE security key.

Example 114 includes the subject matter of Example 112 or 113, and optionally, wherein the WLAN link comprises a Point-to-Point (P2P) link between the UE and the cellular node.

Example 115 includes the subject matter of any one of Examples 112-114, and optionally, wherein the WLAN identifier of the UE comprises a Media Access Control (MAC) address of the UE, or an authentication identifier of the UE.

Example 116 includes the subject matter of any one of Examples 112-115, and optionally, wherein the method comprises authenticating the UE via a local Authentication, Authorization and Accounting (AAA) server.

Example 117 includes the subject matter of any one of Examples 112-116, and optionally, wherein the cellular manager comprises an Evolved Node B (eNB).

Example 118 includes the subject matter of any one of Examples 112-117, and optionally, wherein the method comprises receiving the UE security key from the cellular manager.

Example 119 includes the subject matter of any one of Examples 112-117, and optionally, wherein the method comprises sending the UE security key to the cellular manager.

Example 120 includes the subject matter of any one of Examples 112-119, and optionally, wherein the UE security key comprises a random key.

Example 121 includes the subject matter of any one of Examples 112-120, and optionally, wherein the UE security key comprises a pre-shared key (PSK).

Example 122 includes the subject matter of Example 121, and optionally, wherein the PSK comprises a Wireless-Fidelity Protected Access (WPA) PSK.

Example 123 includes the subject matter of any one of Examples 112-122, and optionally, wherein the method comprises authenticating the UE based on the UE security key.

Example 124 includes the subject matter of any one of Examples 112-123, and optionally, wherein the method comprises encrypting communications with the UE based on the UE security key.

Example 125 includes a product including one or more tangible computer-readable non-transitory storage media comprising computer-executable instructions operable to, when executed by at least one computer processor, enable the at least one computer processor to implement a method at an integrated evolved Node B (eNB) Access Point (AP) (eNB/AP), the method comprising transmitting to a User Equipment (UE) a cellular message including a UE security key; authenticating the UE at the AP based on the UE security key; and establishing a Wireless Local Area Network (WLAN) link with the UE.

Example 126 includes the subject matter of Example 125, and optionally, wherein the cellular message comprises a Radio Resource Control (RRC) message.

Example 127 includes the subject matter of Example 125 or 126, and optionally, wherein the method comprises receiving at the eNB an identifier of the UE from the UE, and sending the identifier of the UE to the AP.

Example 128 includes the subject matter of Example 127, and optionally, wherein the identifier of the UE comprises a Media Access Control (MAC) address of the UE, or an authentication identifier of the UE.

Example 129 includes the subject matter of Example 127 or 128, and optionally, wherein the method comprises transmitting an information request message from the eNB to the UE, and receiving from the UE an information response message in response to the information request message, the information response message including the identifier of the UE.

Example 130 includes the subject matter of any one of Examples 125-129, and optionally, wherein the method comprises transmitting from the eNB to the UE a request to establish a Point to Point (P2P) link between the eNB and the UE, the request to establish the P2P link including the UE security key.

Example 131 includes the subject matter of any one of Examples 125-130 wherein the UE security key comprises a pre-shared key (PSK).

Example 132 includes the subject matter of Example 131, and optionally, wherein the PSK comprises a Wireless-Fidelity Protected Access (WPA) PSK.

Example 133 includes a User Equipment (UE) comprising means for receiving a cellular message from a cellular node via a cellular link, the cellular message including a UE security key; and means for establishing a link with a Wireless Local Area Network (WLAN) Access Point (AP) based on the UE security key.

Example 134 includes the subject matter of Example 133, and optionally, comprising means for receiving from the cellular node a Radio Resource Control (RRC) message including the UE security key.

Example 135 includes the subject matter of Example 133 or 134, and optionally, comprising means for sending to the cellular node a WLAN identifier of the UE, and using the WLAN identifier of the UE to connect with the WLAN AP.

Example 136 includes the subject matter of Example 135, and optionally, wherein the WLAN identifier of the UE comprises a Media Access Control (MAC) address of the UE, or an authentication identifier of the UE.

Example 137 includes the subject matter of Example 135 or 136, and optionally, comprising means for receiving an information request message from the cellular node, and transmitting to the cellular node an information response message in response to the information request message, the information response message including the WLAN identifier of the UE.

Example 138 includes the subject matter of any one of Examples 133-137, and optionally, comprising means for receiving from the cellular node a request to establish a Point to Point (P2P) link with the cellular node, the request to establish the P2P link including the UE security key.

Example 139 includes the subject matter of any one of Examples 133-138, and optionally, wherein the UE security key comprises a pre-shared key (PSK).

Example 140 includes the subject matter of Example 139, and optionally, wherein the PSK comprises a Wireless-Fidelity Protected Access (WPA) PSK.

Example 141 includes the subject matter of any one of Examples 133-140, and optionally, comprising means for authenticating the UE with the WLAN AP based on the UE security key.

Example 142 includes the subject matter of any one of Examples 133-141, and optionally, comprising means for encrypting communications between the UE and the WLAN AP based on the UE security key.

Example 143 includes an evolved Node B (eNB) comprising mean for communicating security information corresponding to a User Equipment (UE) with a Wireless Local Area Network (WLAN) access device, the security information including a WLAN identifier of the UE and a UE security key assigned to the UE; and means for transmitting to the UE a cellular message via a cellular link, the cellular message including the UE security key, and WLAN identification information to identify the WLAN access device.

Example 144 includes the subject matter of Example 143, and optionally, comprising means for establishing a Point-to-Point (P2P) link with the UE via the WLAN access device, the cellular message including a request to establish the P2P link, and a transport address of the eNB.

Example 145 includes the subject matter of Example 143 or 144, and optionally, wherein the cellular message comprises a Radio Resource Control (RRC) message from the eNB to the UE.

Example 146 includes the subject matter of any one of Examples 143-145, and optionally, wherein the WLAN identifier of the UE comprises a Media Access Control (MAC) address of the UE, or an authentication identifier of the UE.

Example 147 includes the subject matter of any one of Examples 143-146, and optionally, comprising means for transmitting to the UE an information request message, and receiving from the UE an information response message in response to the information request message, the information response message including the WLAN identifier of the UE.

Example 148 includes the subject matter of any one of Examples 143-147, and optionally, comprising means for sending the UE security key to the WLAN access device.

Example 149 includes the subject matter of any one of Examples 143-147, and optionally, comprising means for receiving the UE security key from the WLAN access device.

Example 150 includes the subject matter of any one of Examples 143-149, and optionally, wherein the UE security key comprises a random key.

Example 151 includes the subject matter of any one of Examples 143-150, and optionally, wherein the UE security key comprises a pre-shared key (PSK).

Example 152 includes the subject matter of Example 151, and optionally, wherein the PSK comprises a Wireless-Fidelity Protected Access (WPA) PSK.

Example 153 includes a Wireless Local Area Network (WLAN) access device comprising means for communicating security information corresponding to a User Equipment (UE) with a cellular manager, the security information including a WLAN identifier of the UE and a UE security key assigned to the UE; and means for establishing a WLAN link with the UE, based the UE security key.

Example 154 includes the subject matter of Example 153, and optionally, comprising means for communicating with the cellular manager a first UE security key assigned to a first UE, and a second UE security key assigned to a second UE, the second UE security key being different from the first UE security key.

Example 155 includes the subject matter of Example 153 or 154, and optionally, wherein the WLAN link comprises a Point-to-Point (P2P) link between the UE and the cellular node.

Example 156 includes the subject matter of any one of Examples 153-155, and optionally, wherein the WLAN identifier of the UE comprises a Media Access Control (MAC) address of the UE, or an authentication identifier of the UE.

Example 157 includes the subject matter of any one of Examples 153-156, and optionally, comprising means for authenticating the UE via a local Authentication, Authorization and Accounting (AAA) server.

Example 158 includes the subject matter of any one of Examples 153-157, and optionally, wherein the cellular manager comprises an Evolved Node B (eNB).

Example 159 includes the subject matter of any one of Examples 153-158, and optionally, comprising means for receiving the UE security key from the cellular manager.

Example 160 includes the subject matter of any one of Examples 153-158, and optionally, comprising means for sending the UE security key to the cellular manager.

Example 161 includes the subject matter of any one of Examples 153-160, and optionally, wherein the UE security key comprises a random key.

Example 162 includes the subject matter of any one of Examples 153-161, and optionally, wherein the UE security key comprises a pre-shared key (PSK).

Example 163 includes the subject matter of Example 162, and optionally, wherein the PSK comprises a Wireless-Fidelity Protected Access (WPA) PSK.

Example 164 includes the subject matter of any one of Examples 153-163, and optionally, comprising means for authenticating the UE based on the UE security key.

Example 165 includes the subject matter of any one of Examples 153-164, and optionally, comprising means for encrypting communications with the UE based on the UE security key.

Example 166 includes an integrated evolved Node B (eNB) Access Point (AP) (eNB/AP) comprising means for transmitting to a User Equipment (UE) a cellular message including a UE security key; means for authenticating the UE at the AP based on the UE security key; and means for establishing a Wireless Local Area Network (WLAN) link with the UE.

Example 167 includes the subject matter of Example 166, and optionally, wherein the cellular message comprises a Radio Resource Control (RRC) message.

Example 168 includes the subject matter of Example 166 or 167, and optionally, comprising means for receiving at the eNB an identifier of the UE from the UE, and sending the identifier of the UE to the AP.

Example 169 includes the subject matter of Example 168, and optionally, wherein the identifier of the UE comprises a Media Access Control (MAC) address of the UE, or an authentication identifier of the UE.

Example 170 includes the subject matter of Example 168 or 169, and optionally, comprising means for transmitting an information request message from the eNB to the UE, and receiving from the UE an information response message in response to the information request message, the information response message including the identifier of the UE.

Example 171 includes the subject matter of any one of Examples 166-170, and optionally, comprising means for transmitting from the eNB to the UE a request to establish a Point to Point (P2P) link between the eNB and the UE, the request to establish the P2P link including the UE security key.

Example 172 includes the subject matter of any one of Examples 166-171, and optionally, wherein the UE security key comprises a pre-shared key (PSK).

Example 173 includes the subject matter of Example 172, and optionally, wherein the PSK comprises a Wireless-Fidelity Protected Access (WPA) PSK.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus for use in a User Equipment (UE) to communicate in a wireless communication network, the apparatus comprising:
   a Wireless Local Area Network (WLAN) transceiver;
   a cellular transceiver to receive a cellular message from a cellular node via a cellular link, the cellular message comprising a Radio Resource Control (RRC) message to request to establish a Point to Point (P2P) link with said cellular node via a WLAN Access Point (AP), the RRC message comprising a UE security key; and
   a controller to cause the UE to establish a connection with said WLAN AP based on the UE security key, and to establish the P2P link with said cellular node via said WLAN AP.

2. The apparatus of claim 1, wherein said cellular transceiver is to send to said cellular node a WLAN identifier of the UE, said WLAN transceiver is to use the WLAN identifier of the UE to establish the connection with the WLAN AP.

3. The apparatus of claim 2, wherein said cellular transceiver is to receive an information request message from the cellular node, and to transmit to the cellular node an information response message in response to the information request message, the information response message including the WLAN identifier of the UE.

4. The apparatus of claim 1, wherein said controller is to authenticate said UE with said WLAN AP based on the UE security key.

5. The apparatus of claim 1 comprising one or more antennas, a memory and a processor.

6. An apparatus for use in an evolved Node B (eNB) to communicate in a communication network, the apparatus comprising:

an access device interface to communicate security information corresponding to a User Equipment (UE) with a Wireless Local Area Network (WLAN) access device, the security information including a WLAN identifier of the UE and a UE security key assigned to the UE; and a controller to cause the eNB to establish a Point-to-Point (P2P) link with said UE via the WLAN access device, the controller to cause a cellular transceiver of the eNB to transmit to the UE a cellular message via a cellular link to request to establish the P2P link, the cellular message including the UE security key, a transport address of the eNB, and WLAN identification information to identify said WLAN access device.

7. The apparatus of claim 6, wherein the WLAN identifier of the UE comprises a Media Access Control (MAC) address of the UE, or an authentication identifier of the UE.

8. The apparatus of claim 6, wherein said access device interface is to send the UE security key to the WLAN access device.

9. The apparatus of claim 6, wherein said access device interface is to receive the UE security key from the WLAN access device.

10. The apparatus of claim 6, wherein the controller is to cause an Authentication, Authorization and Accounting (AAA) interface of the eNB to send the WLAN identification information to a local AAA server.

11. The apparatus of claim 10, wherein the controller is to cause the AAA interface to communicate the UE security key with the AAA server.

12. The apparatus of claim 6, wherein said UE security key comprises a random key.

13. The apparatus of claim 6 comprising one or more antennas, a memory, and a processor.

14. A method to be performed at a Wireless Local Area Network (WLAN) access device, the method comprising:

communicating security information corresponding to at least a first User Equipment (UE) and a second UE with a cellular manager, the security information comprising a first UE security key assigned to the first UE, and a second UE security key assigned to the second UE, the second UE security key is different from the first UE security key, the security information comprising at least a WLAN identifier of the first UE; and establishing at least a WLAN link with the first UE, based the first UE security key.

15. The method of claim 14 comprising authenticating at least said first UE via a local Authentication, Authorization and Accounting (AAA) server.

16. The method of claim 14 comprising receiving at least the first UE security key from the cellular manager.

17. The method of claim 14, wherein the first UE security key comprises a pre-shared key (PSK).

18. A product including one or more tangible computer-readable non-transitory storage media comprising computer-executable instructions operable to, when executed by at least one computer processor, enable the at least one computer processor to implement operations at an integrated evolved Node B (eNB) Access Point (AP) (eNB/AP), the operations comprising:

transmitting to a User Equipment (UE) a cellular message comprising a Radio Resource Control (RRC) message, the RRC message comprising a UE security key;

authenticating the UE at the AP based on the UE security key; and establishing a Wireless Local Area Network (WLAN) link with the UE.

19. The product of claim 18, wherein the operations comprise receiving at the eNB an identifier of the UE from the UE, and sending the identifier of the UE to the AP.

20. The product of claim 18, wherein the operations comprise transmitting from the eNB to the UE a request to establish a Point to Point (P2P) link between the eNB and the UE, the request to establish the P2P link including the UE security key.

* * * * *